UNITED STATES PATENT OFFICE.

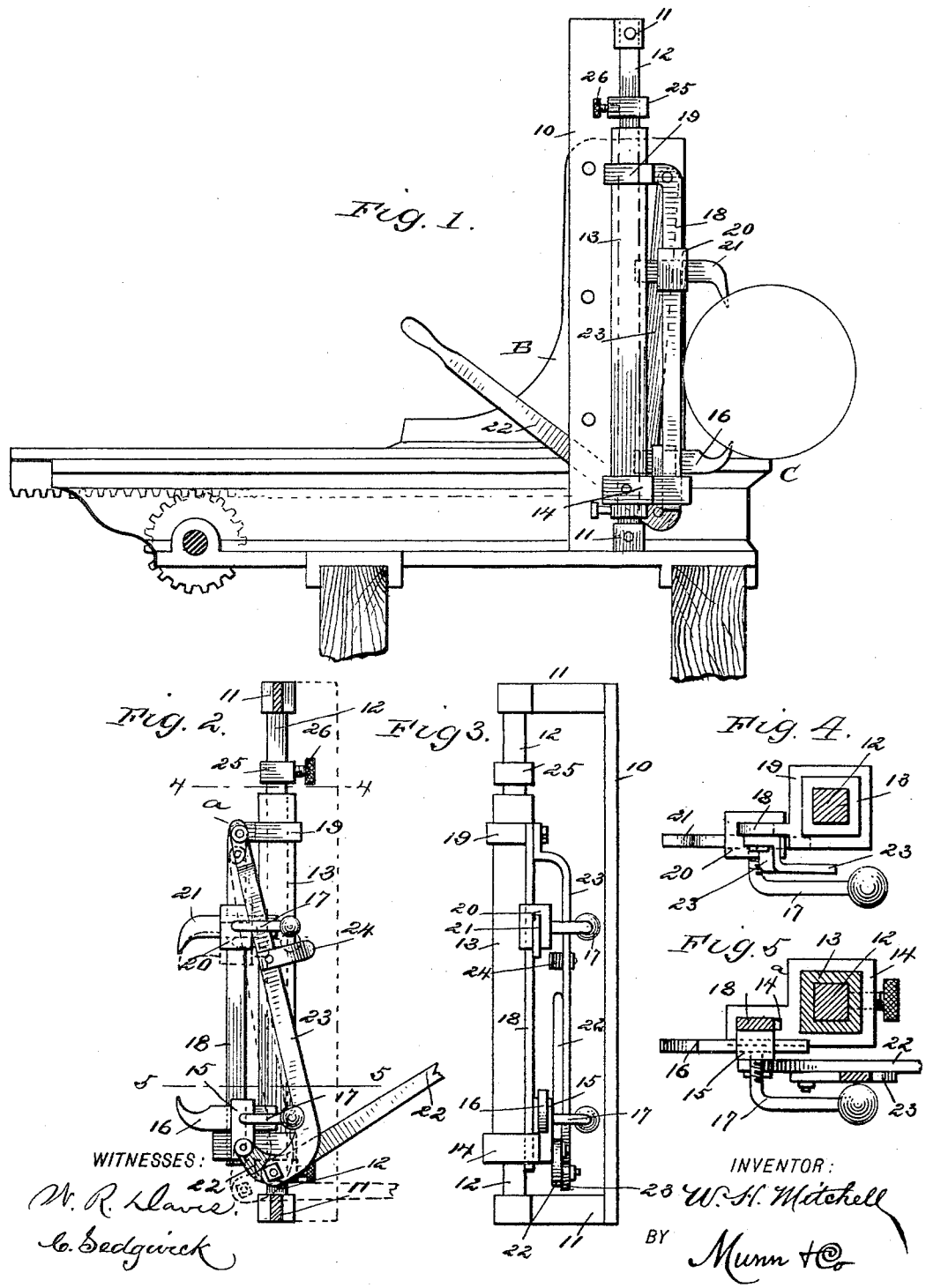

WILLIAM H. MITCHELL, OF SMITH'S CROSS ROADS, KENTUCKY.

SAW-MILL DOG.

SPECIFICATION forming part of Letters Patent No. 458,912, dated September 1, 1891.

Application filed October 23, 1890. Serial No. 369,104. (No model.)

*To all whom it may concern:*

Be it known that I, WILLIAM H. MITCHELL, of Smith's Cross Roads, in the county of Metcalfe and State of Kentucky, have invented a new and useful Improvement in Saw-Mill Dogs, of which the following is a full, clear, and exact description.

My invention relates to an improvement in saw-mill dogs, and has for its object to provide a device which will engage with the upper and lower surfaces of round or quartered logs and not permit said logs to move, and also to provide a means whereby the log or quarter may be moved downward over the point of the head-block and retained in its proper relation to the saw.

A further object of the invention is to provide a device capable of manipulation as an over dog, if so desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a side elevation of the device illustrated as applied to a knee of a log-carriage. Fig. 2 is an inner side view of the device detached from the knee. Fig. 3 is a front elevation of the device detached. Fig. 4 is a transverse section on line 4 4 of Fig. 2, and Fig. 5 is a similar section on line 5 5 of Fig. 2.

The device consists of a perpendicular plate 10, from the outer side edges of which, at the top and bottom, a horizontal arm 11 is outwardly projected, and to said arms the upper and lower ends of a post 12 are attached. The post 12 is preferably rectangular in cross-section, but may be otherwise shaped, if desired. Upon the post a sleeve 13 is held to slide, having secured to its lower end a horizontal bracket 14, provided at one side near its outer end with a perpendicular guide-arm 15 and a vertical opening $14^a$ at one side of the arm.

In the guide-arm 15 the lower dog is held to slide, the outer extremity of which dog is curved upward, and the dog is held in a stationary position when desired, preferably through the medium of a crank-like set-screw 17. Although the sliding dog 16 is usually employed, it may, however, be omitted, in which event the bracket 14 is made larger than illustrated and one end shaped to correspond to the contour of the dog.

In the opening $14^a$ of the bracket 14 the lower end of an adjusting bar 18 is capable of sliding, which arm is carried upward to a point near the top of the sleeve and at its upper end is provided with an attached or integral collar 19, which collar loosely surrounds the sleeve.

Upon the adjusting-bar 18 a socket 20 is held to slide, in which socket the upper dog 21 is adjustably and horizontally mounted, the outer end of which upper dog is curved downward. The said upper dog is rigidly held in the socket, when desired, through the medium of a crank-like set-screw 17, such as is mentioned in connection with the lower dog. In the event the lower socket constitutes the lower dog, as heretofore stated, the upper dog is formed integral with the upper socket 20, the socket being held in position upon the adjusting-bar by any form of set-screw.

To the inner face of the bracket 14, at or near its lower end, the lower extremity of an adjusting-lever 22 is pivoted. The body of the said lever is straight, and the lower or pivotal end is outwardly and upwardly curved, as best illustrated in Fig. 2.

To the lower or curved portion of the adjusting-lever 22, preferably in horizontal alignment with the body portion thereof, the lower curved end of a link 23 is pivoted, which link extends upward and is secured at its upper extremity to the adjusting-bar 18, preferably at its connection with the collar 19, as is illustrated at *a* in Figs. 2 and 3.

Upon the inner side of the link 23 a spring-keeper 24, of any approved construction, is secured, which keeper extends rearward at a right angle to the body of the link, and the said keeper is adapted to be engaged by the body or handle of the adjusting-lever 22 when said lever is in its upright position.

One of the devices above described is attached to the outer face of each knee B of the log-carriage, and the attachment is effected by screwing, bolting, or otherwise attaching the upright plate 10 to the knee, as is illustrated in Fig. 2. By locating the devices upon the outer face of the knees it is evident that when the log or quarter is held between the dogs the carriage may be adjusted forward to carry the log or quarter over the edge of the head-block C without difficulty, and that the log or quarter will still retain its proper relation to the saw.

Upon the post 12, above the upper end of the sleeve 13, a collar 25 is loosely mounted, being fixed to the post through the medium of a set-screw 26 when occasion may demand.

In operation, when the log or quarter is to be clamped by both the upper and lower dogs the adjusting-lever 22 is carried upward to an essentially-vertical position, the lower dog is brought in contact with the under surface of the log or quarter, and the upper dog carried downward to contact with the upper or opposite surface, and the said upper dog is thereupon fixedly secured to the adjusting-bar 18 by means of its set-screw 17. The lever is then carried downward to the position shown in Fig. 1. By reason of the curved pivotal ends of the lever 22 and link 23, when the lever is carried downward the lower end of the link is forced downward, whereby the upper dog is firmly pressed in the log or quarter. The same movement of the lever forces the sleeve 13 upward, thereby causing the lower dog to enter the log at the same time. When the adjusting-lever is in its lower position, it will remain in said position until thrown upward because of the relation of the pivotal point of the lever with the pivoted extremity of the link, as shown in dotted lines in Fig. 2. When the upper dog only is to be manipulated, in which capacity the device may be said to act as an over dog, the collar 25 is loosened and permitted to drop downward to a contact with the upper end of the sleeve 13, and is then secured rigidly to the post by its set-screw 26. The lower dog is now made to remain stationary, as the sleeve cannot work upward, and when the lever 22 is carried downward the upper dog only moves, and the said dog travels downward with the link 23 and embeds itself in the log or quarter.

It will be observed that the device above described is very simple and effective, and that it may be expeditiously and conveniently applied to any form of knee.

Having thus described my invention, I claim as new and desire to secure by Letters Patent—

1. The combination, with a post, a sleeve mounted to slide upon said post, and a bracket projected from the sleeve and adapted to hold an adjustable lower dog, of an adjusting-bar held to slide in the sleeve-bracket at one end and loosely mounted at its other end upon the sleeve, a socket adjustable upon the adjusting-bar and capable of retaining an upper dog, an adjusting-lever fulcrumed upon the sleeve-bracket, and a link pivoted at one end upon the adjusting-lever near its fulcrum and attached at its other end to the adjusting-bar, substantially as shown and described.

2. The combination, with a post, a sleeve loosely mounted upon the post, an adjustable collar also loosely mounted upon the post above the sleeve, and a bracket projected from the lower end of the sleeve, of an adjusting-bar the lower end of which is capable of sliding in the sleeve-bracket and the upper end whereof loosely surrounds the sleeve, a socket adjustable upon the said bar, a dog adjustably located in the said socket, and a second dog adjustably secured in the sleeve-bracket, an adjusting-lever fulcrumed at its lower end to the sleeve-bracket, and a link pivoted at one end to the lever near its fulcrum, the opposite end of the said link being attached to the adjusting-bar, substantially as and for the purpose specified.

3. The combination, with a post, a sleeve loosely mounted upon the post, an adjustable collar also loosely mounted upon the post above the sleeve, and a bracket projected from the lower end of the sleeve, of an adjusting-bar the lower end of which is capable of sliding in the sleeve-bracket and the upper end whereof loosely surrounds the sleeve, a socket adjustable upon the said bar, a dog adjustably located in the said socket, and a second dog adjustably secured in the sleeve-bracket, an adjusting-lever fulcrumed at its lower end to the sleeve-bracket, a link pivoted at one end to the lever near its fulcrum, the opposite end of the said link being attached to the adjusting-bar, and a keeper attached to the link and adapted for engagement with the lever, substantially as and for the purpose specified.

4. The combination, with a post, a sleeve loosely mounted upon said post, provided with a bracket at its lower end, and an adjusting-bar the lower end of which is adapted to slide in the sleeve-bracket, the upper end being provided with a collar loosely surrounding the sleeve, of a socket adjustably mounted upon the adjusting-bar, a dog adjustably held in said socket, and a second dog adjustably held in the sleeve-bracket, an adjusting-lever having a curved lower end fulcrumed at its lower extremity to the bracket, and a link provided with a curved lower end, pivoted at said end upon the curved portion of the lever near its fulcrum, the said link being attached at its opposite end to the adjusting-bar, as and for the purpose specified.

WILLIAM H. MITCHELL.

Witnesses:
SPERY B. SMITH,
RILY GRINSTEAL.